(12) United States Patent
Hsu (10) Patent No.: US 9,169,868 B2
(45) Date of Patent: Oct. 27, 2015

(54) MOVABLE MEMBER FOR LINEAR SLIDE ASSEMBLY

(75) Inventor: Ming-che Hsu, Tainan (TW)

(73) Assignee: CHIEFTECH PRECISION CO., LTD., Tainan (TW)

( * ) Notice: Subject to any disclaimer, the term of this patent is extended or adjusted under 35 U.S.C. 154(b) by 0 days.

(21) Appl. No.: 13/461,018

(22) Filed: May 1, 2012

(65) Prior Publication Data

US 2013/0294713 A1  Nov. 7, 2013

(51) Int. Cl.
*F16C 29/00* (2006.01)
*F16C 29/06* (2006.01)

(52) U.S. Cl.
CPC .................. *F16C 29/0642* (2013.01)

(58) Field of Classification Search
CPC ...... F16C 29/04; F16C 29/06; F16C 29/0602; F16C 29/0609; F16C 29/063–29/0642; F16C 29/0652–29/0659; F16C 29/0669
USPC .......................................... 384/43–45, 49, 50
See application file for complete search history.

(56) References Cited

U.S. PATENT DOCUMENTS

| | | | | |
|---|---|---|---|---|
| 5,080,498 A | * | 1/1992 | Tsukada | 384/15 |
| 6,203,199 B1 | * | 3/2001 | Pfeuffer | 384/45 |
| 7,479,885 B2 | * | 1/2009 | Greubel | 340/572.7 |
| 7,604,408 B2 | * | 10/2009 | Dorn et al. | 384/45 |
| 2006/0023978 A1 | * | 2/2006 | Haub | 384/13 |
| 2007/0140602 A1 | * | 6/2007 | Hsu et al. | 384/45 |
| 2009/0196539 A1 | * | 8/2009 | Pfeuffer et al. | 384/45 |

FOREIGN PATENT DOCUMENTS

| | | |
|---|---|---|
| TW | I285244 B | 8/2007 |
| TW | M347492 U | 12/2008 |
| TW | I312036 B | 7/2009 |
| TW | M392890 U1 | 11/2010 |
| TW | 201118271 A | 6/2011 |

\* cited by examiner

*Primary Examiner* — Richard W Ridley
*Assistant Examiner* — Brian McGovern
(74) *Attorney, Agent, or Firm* — Muncy, Geissler, Olds & Lowe, P.C.

(57) ABSTRACT

A movable member of a linear slide assembly includes a slide member having two legs to mount the slide member to a rail. Two covers are respectively connected to two ends of the slide member. A track is formed between the legs of the slide member and the rail. Rolling members are installed in the circulation path of the slide assembly and drive the movable member along the rail back and forth. Two reinforcement plates are respectively connected to outside of the two covers and each reinforcement plate has a side plate and two bent extensions which are fixed to the legs of the slide member. The bent extensions each have an engaging portion which is engaged with the protrusion on the slide member. The engaging portions bear axial force applied to the rolling members to secure the connection between the covers and the slide member.

7 Claims, 7 Drawing Sheets

MOVABLE MEMBER FOR LINEAR SLIDE ASSEMBLY

FIELD OF THE INVENTION

The present invention relates to a movable member for a linear slide assembly, and more particularly, to an engaging portion with reinforcement plates and the engaging portion engaged with the protrusions of the slide member to reinforce the connection between the endcaps and the slide member.

BACKGROUND OF THE INVENTION

The conventional linear slide assembly is used on precise machine of large scale so as to increase the precision, smoothness, stability and life of use of the parts movable along the slide assembly.

The linear slide assembly is composed of a rail and a movable member which is movably mounted to the rail. The movable member has a slide member and two endcaps which are connected to two ends of the slide member. The slide member provides two legs which are cooperated with the slide to form a track. The endcaps form a turning path connected with the track. The slide member further provides a returning path which is connected with the turning path such that the track, the turning path and the returning path form an enclosed circulation path. The rolling members are installed in the circulation path and drive the movable member along the rail back and forth. The related inventions are disclosed in Taiwan Utility Model No. M392890, I32036 or M347492.

The relative inventions have a drawback which is that the endcaps are made by way of plastic injection so as to obtain their complicated shapes, however, the plastic material cannot bear large load so that the rolling members moving in the circulation path apply a component force to the endcaps when the rolling members enters into the returning path from the returning path or the track. When the slide member moves at high speed, the force applied to the endcaps is increased and the endcaps sometimes are deformed or even disengaged from the slide member. This makes the slide member to be damaged or unstable when moving along the rail. The drawback also restricts the speed of the slide member because the higher speed that the slide member moves, the rolling members also move at higher speed and which makes the endcaps to bear higher axial force. In order to avoid from damage to the endcaps, the speed of the slide member is restricted.

In order to improve the weak connection between the endcaps and the slide member, and the speed restriction of the slide member, the application has filed Taiwan Patent No. 1285244 and Taiwan Patent Application No. 201118271, and a metallic reinforcement plates is provided on the outside of the endcap to bear higher load by the high strength of the metal material such that the connection between the endcaps and the slide member, and the speed of the slide member can be increased.

However, the connection between the reinforcement plate and the endcap is made by using screws connecting the bent extensions of the legs of the slide member and the reinforcement plate. The static friction of the screws bears the axial force of the endcap. However, when the axial force is larger than the static friction, the endcap may loose from the slide member.

The present invention intends to provide a movable member of a linear slide assembly in response to the requirement of high speed movement of the slide member. The reinforcement plate has an engaging portion which is engaged with the protrusion of the slide member such that the reinforce plate is connected to the slide member by engagement in the form of recess and protrusion to bear larger axial load. The connection between the endcap and the slide member is more secure and the slide member is allowed to move faster.

SUMMARY OF THE INVENTION

The present invention relates to a movable member of a linear slide assembly, and comprises a slide member having two legs extending therefrom so as to mount the slide member to a rail. Each leg has more than one protrusion on each of two ends thereof. Two endcaps are respectively connected to two ends of the slide member. Two reinforcement plates are respectively connected to outside of the two endcaps and each reinforcement plate has a side plate and two bent extensions extend from the side plate. Each of the two bent extensions has a fixing hole and more than one engaging portion. Two fixing members respectively extend through the fixing holes to fix the two bent extensions to the two legs of the slide member. The more than one engaging portion of the two bent extensions is engaged with the more than one protrusion.

Preferably, the more than one engaging portion is an engaging hole or a notch.

Preferably, each of the two legs of the slide member has a recess defined in each of two ends thereof and the two respective recesses are located corresponding to the two bent extensions. The depth of each of the recesses and the height of each of the protrusions are equal to the thickness of the bent extensions.

Preferably, the more than one protrusion and the more than one engaging portion are polygonal or circular.

The present invention provides reinforcement plates which have engaging portions engaged with the protrusions of the slide member so as to directly bear axial force and spread the axial component force applied to the endcaps by the rolling members. This increases the connection between the endcaps and the slide member to allow the endcaps to bear larger axial loads. When the rolling members enter the turning path from the track, the axial component forces applied to the endcaps from the rolling members do not deform and loosen the endcaps.

The connection between the endcaps and the slide member is more secure so that the rolling members can move in the circulation path at high speed, and the movable member moves along the rail at high speed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
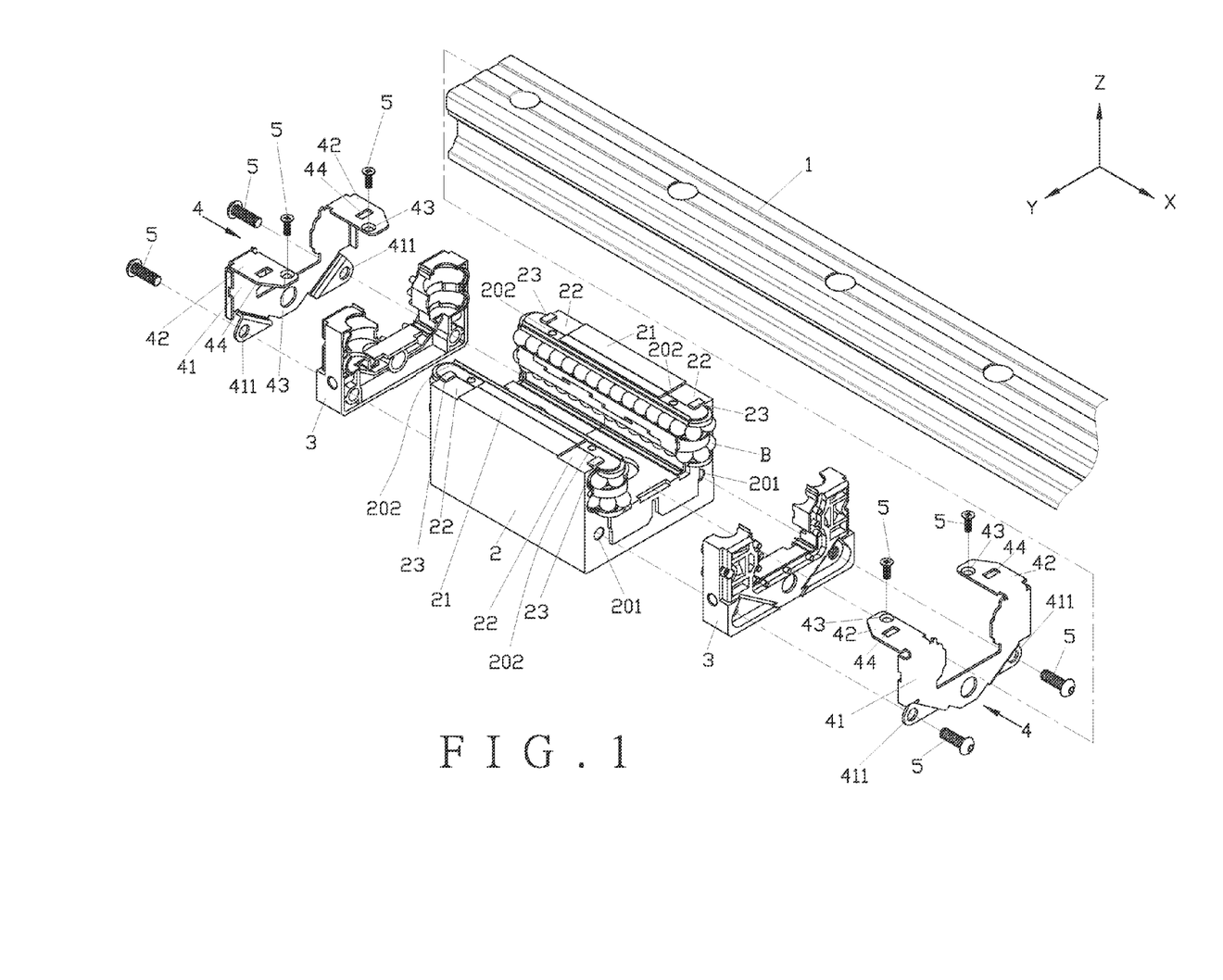
FIG. 1 is an exploded view to show the rail and the slide member of the present invention.
Figure 2:
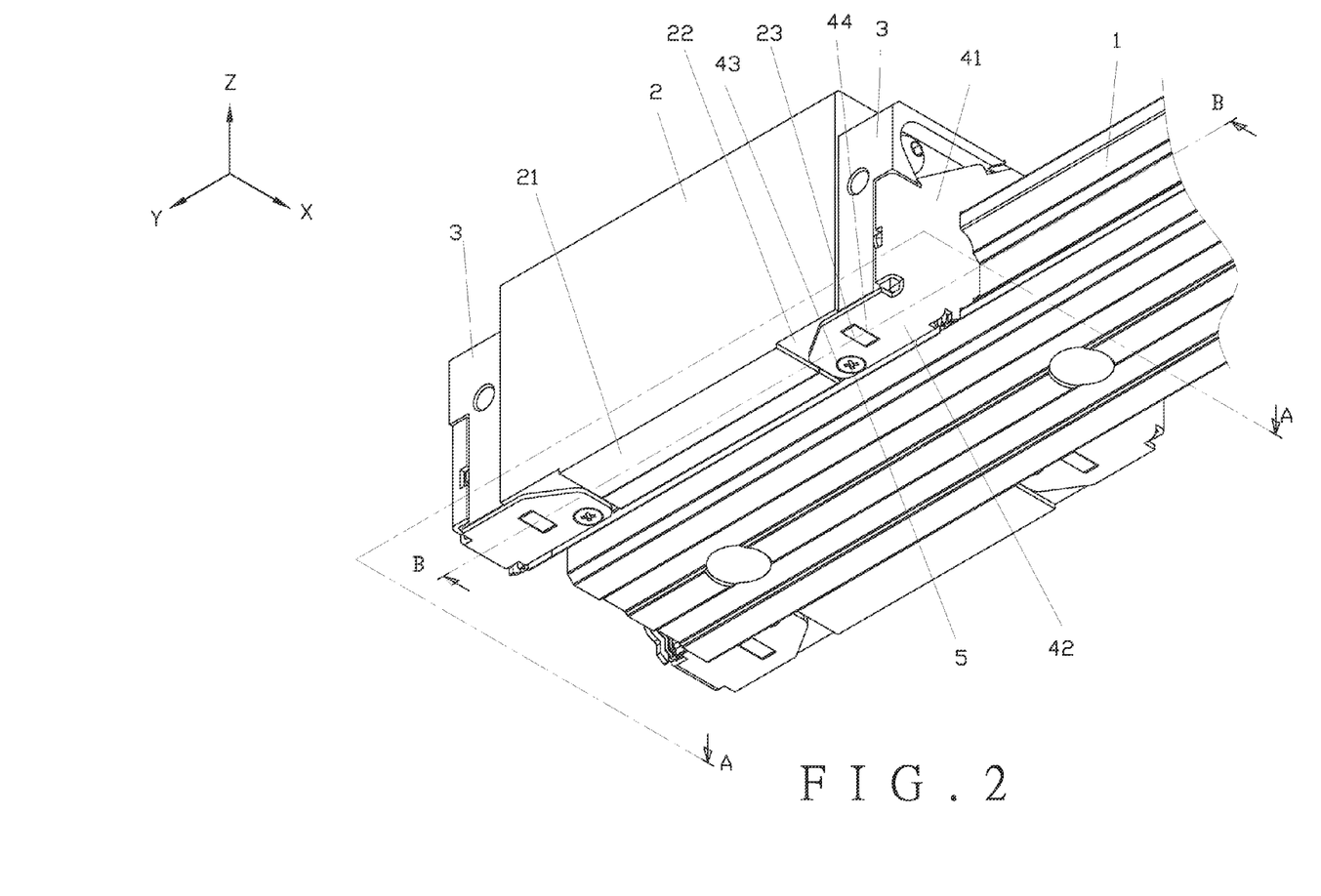
FIG. 2 is a cross sectional view of the connection between the rail and the slide member of the present invention.

Referring to FIGS. 1 and 2, the present invention comprises a rail 1 and a slide member 2 which has two legs 21 extending therefrom so as to mount the slide member 2 to the rail 1. Each leg 21 has a recess 22 in each of two ends thereof and each recess 22 has a protrusion 23 extending therefrom. In FIGS. 1 and 2, X, Y and Z-directions indicate orientation of the rail 1 and the slide member 2.

Two endcaps 3 are respectively connected to two ends of the slide member 2. Two reinforcement plates 4 are respectively connected to outside of the two endcaps 3 and each reinforcement plate 4 has a side plate 41 and two bent extensions 42 extend from the side plate 41. Each of the two bent extensions 42 has a second fixing hole 43 located corresponding to the recess 22 of each leg 21 of the sliding member 2. The side plates 41 each have a first fixing hole 411. Each of two bent extensions 42 having an engaging hole 44 which is engaged with a protrusion 23. In this embodiment, the protrusions 23 and the engaging holes 44 are polygonal in shape. In the drawing, the quadrilateral protrusion 23 is engaged with the engaging hole 44. It is noted that the protrusions 23 and the engaging holes 44 can be circular in shape which is not shown, depending on the needs and convenience. Fixing members 5 are used to respectively extend through the second fixing holes 43 and second combining holes 202 of two legs 21 to fix the side plates 41 to the endcaps 3, and respectively extend through the first fixing holes 411 and first combining holes 201 of two legs 21 to fix the two bent extensions 42 to the two legs 21 of the slide member 2. Generally, the fixing members 5 are bolts which extend through the second and first fixing holes 43 and 411 to perpendicularly fix the two bent extensions 42 of the reinforcement plate 4 to the slide member 2. The depth of each of the recesses 22 and the height of each of the protrusions 23 are equal to the thickness of the bent extensions 42. When the two bent extensions 42 of the reinforcement plate 4 are fixed to the legs 21 of the slide members 2, it does not increase the volume of the slide member 2 for the miniaturized linear slide assembly.

Figure 3:
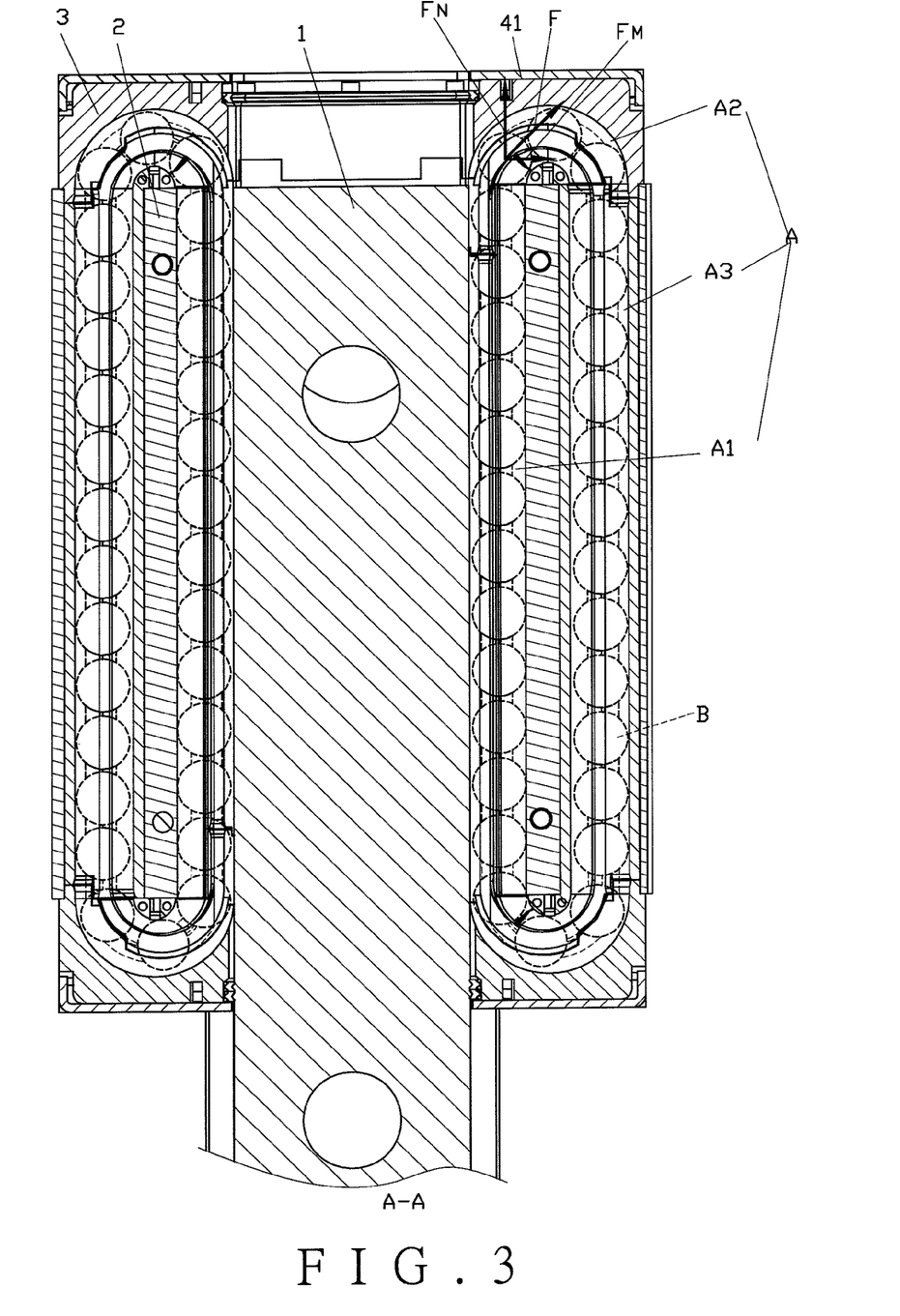
FIG. 3 is a cross sectional view, taken along lien A-A in FIG. 2.

As shown in FIG. 3, the rail 1, the slide member 2 and the endcaps 3 form a circulation path "A" which comprises a track "A1" between the rail 1 and the two legs 21 of the slide member 2, a turning path "A2" on the endcaps 3 and connected with the track "A1", and a returning path "A3" on the slide member 2 and connected to the turning path A2. The rolling members "B", rollers, or rolling rods (rollers are used in this embodiment) are installed in the circulation path "A" and move in the endless travel in the circulation path "A". The rolling members "B" drive the slide member 2 along the rail 1 back and forth.

Figure 4:
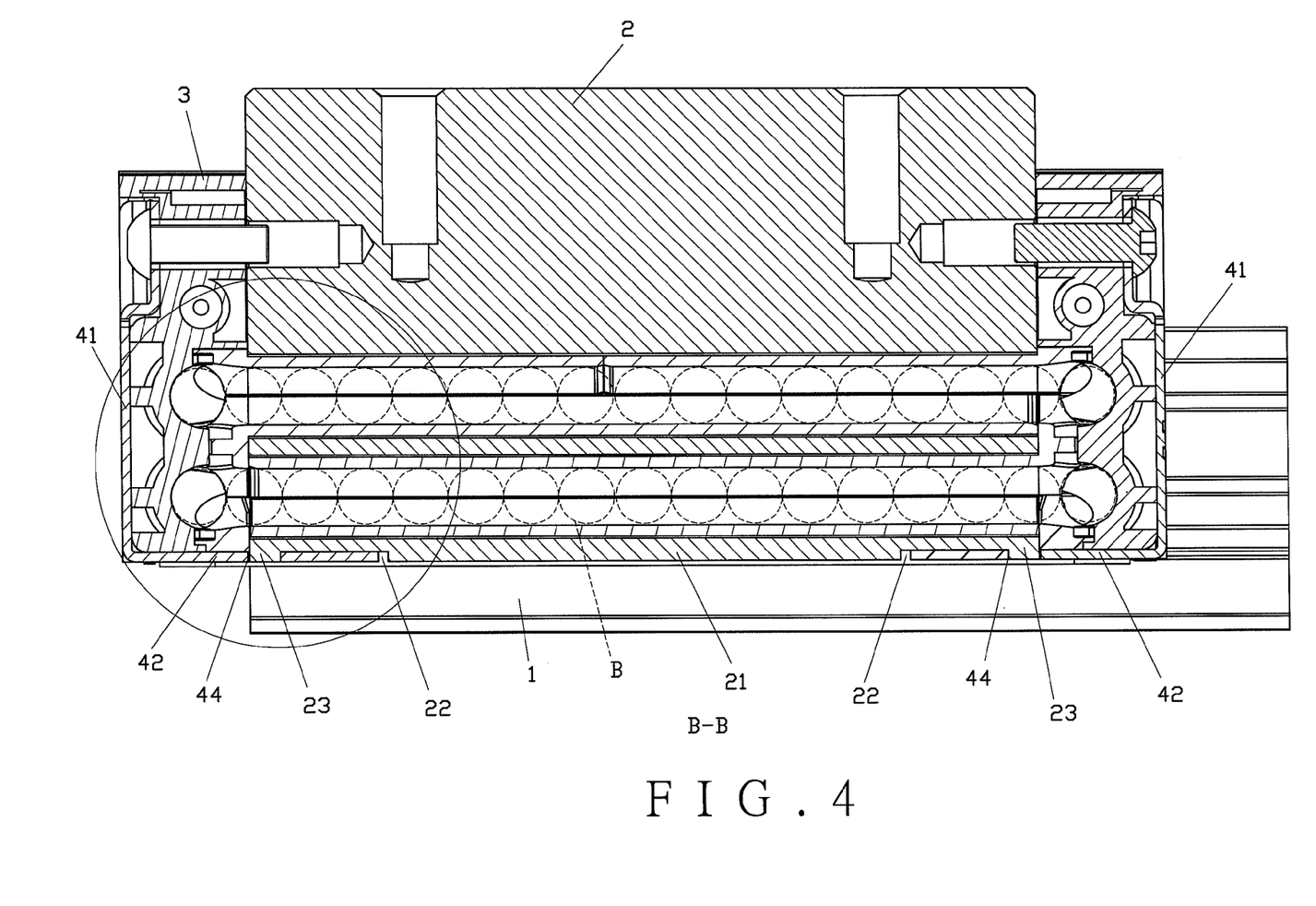
FIG. 4 is a cross sectional view, taken along lien B-B in FIG. 2.
Figure 5:
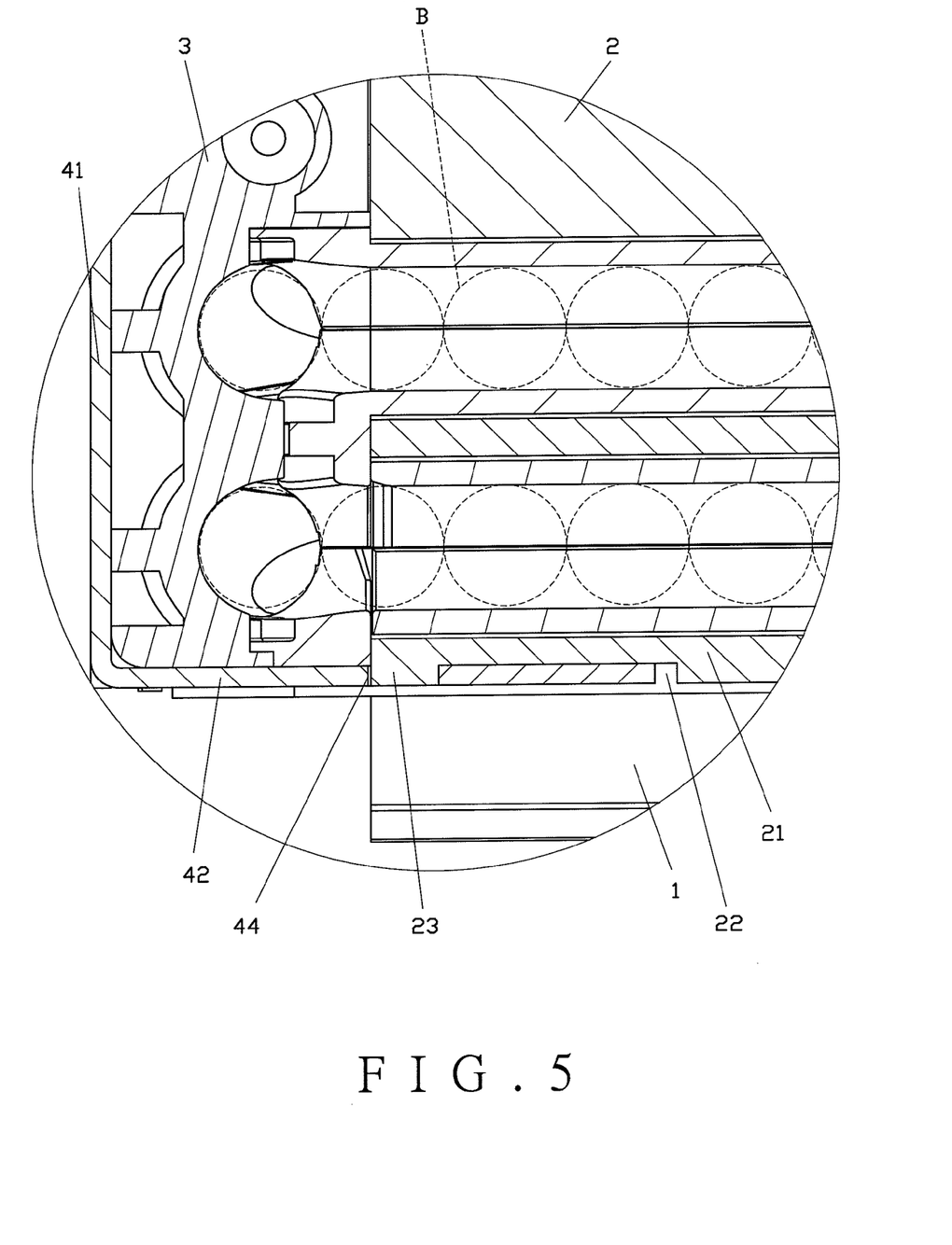
FIG. 5 is an enlarged view of the circled portion in FIG. 4.

Referring to FIGS. 3 to 5, when the rolling members "B" enter into the turning path "A2" from the track "A1" or the returning path "A3", the force "F" that the rolling members "B" apply to the inside of the endcaps 3 can be divided into the axial component force "Fn" and a horizontal component force "Fm". The axial component force "Fn" applies to the rear side of the inside of the endcap 3. Thanks to the reinforcement plate 4 on the outside of the endcap 3, the axial component force "Fn" is directly applied to the reinforcement plate 4 and is transferred to the slide member 2 via the fixing members 5. Therefore, the axial component force "Fn" that the rolling members "B" apply to the endcap 3 can be spread. This is the way that the reinforcement plate 4 bears the load of the endcap 3. In other words, the fixing members 5 use the locking force and the static friction force to bear the axial force. In this embodiment, the engaging holes 44 of the bent extensions 42 are engaged with the protrusions 23 of the slide member 2. The connection between the reinforcement plates 4 and the slide member 2 is made not only by the locking force of the fixing member 5, but also by the engagement between the contours of protrusions and recesses such that the engaging holes 44 of the bent extensions 42 bear and spread the axial force applied to the protrusions 23 of the slide member 2 by the rolling members "B". Accordingly, the endcaps 3 can bear larger axial load and this allows the rolling members "B" to move in the circulation path "A" at higher speed and the movable member moves along the rail 1 smoothly.

Figure 6:
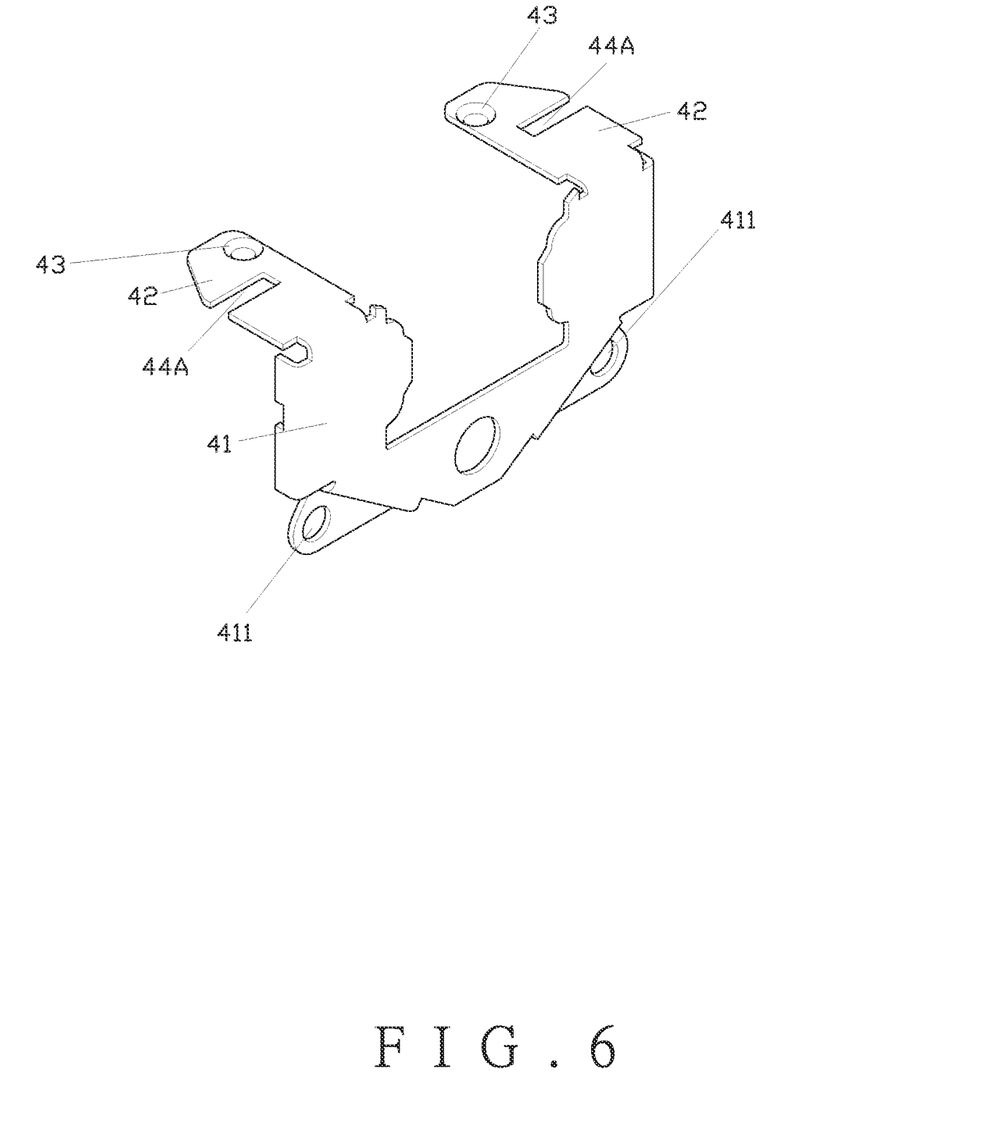
FIG. 6 shows the reinforcement plate of the second embodiment of the present invention.
Figure 7:
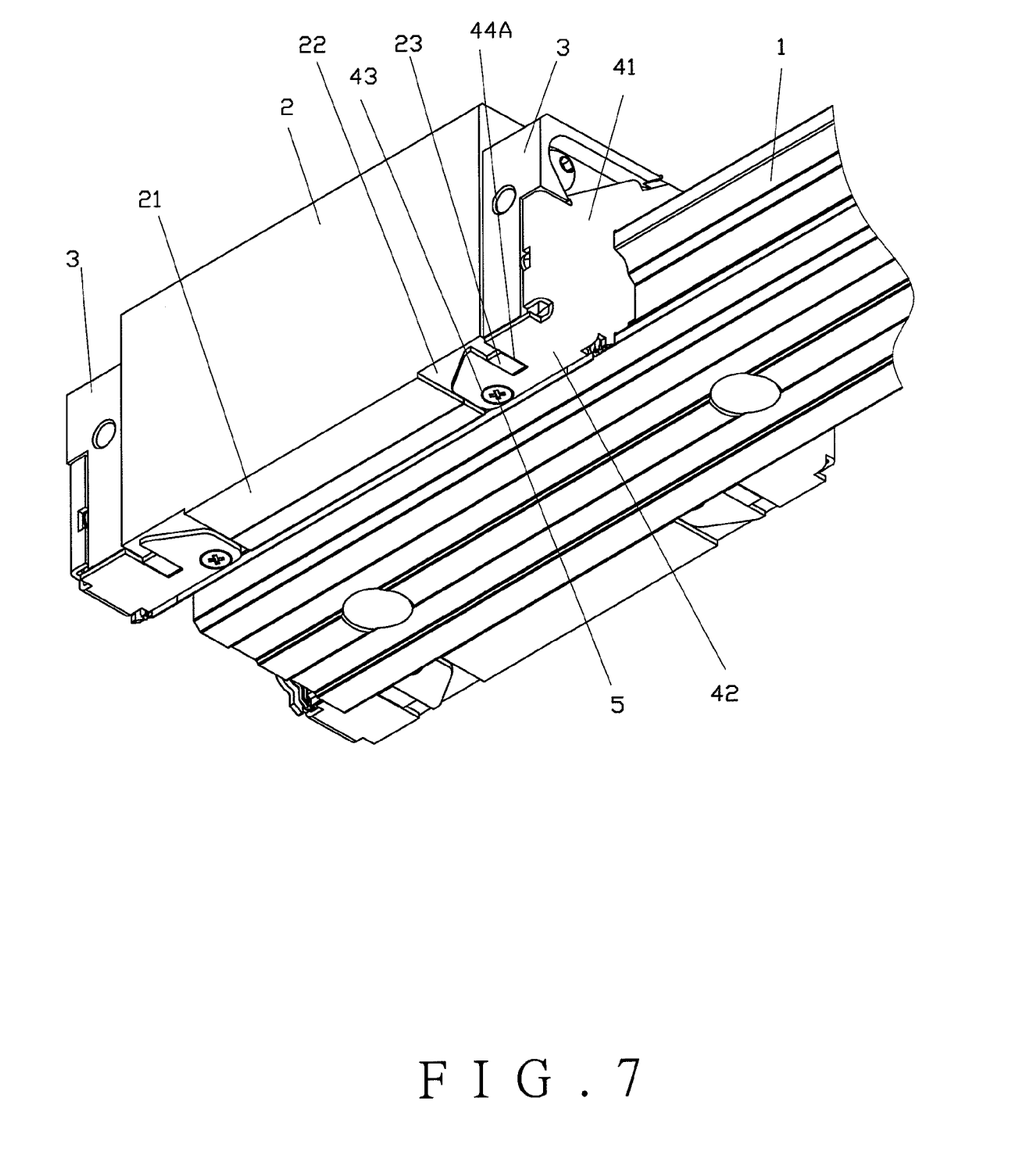
FIG. 7 is a perspective view to show the second embodiment of the rail and the slide member of the present invention.

FIGS. 6 and 7 show the second embodiment of the present invention, wherein the difference from the first embodiment is that the reinforcement plates 4 each have an engaging portion which is a notch 44A with which the protrusion 23 is engaged.

The notches 44A of the bent extensions 42 bear and spread the axial force applied to the protrusions 22 of the slide member 2 by the rolling members "B". Accordingly, the endcaps 3 can bear larger axial load.

While we have shown and described the embodiment in accordance with the present invention, it should be clear to those skilled in the art that further embodiments may be made without departing from the scope of the present invention.

What is claimed is:

1. A movable member of a linear slide assembly, the movable member having an X-direction defined as a longitudinal direction and having a Y-direction perpendicular to the X-direction, a Z-direction perpendicular to both the X-direction and the Y-direction, an XY plane is composed of the X-direction and the Y-direction, a YZ plane is composed of the Y-direction and the Z-direction, and an XZ plane is composed of the X-direction and the Z-direction, the movable member comprising:

a slide member having two legs extending along the Z-direction so as to mount the slide member to a rail, wherein the slide member has two ends with two first combining holes on each end, and each leg has two recesses with each recess disposed adjacent to a respective one of the two ends, each recess having a second combining hole and a protrusion, said two ends of the slide member being parallel with the YZ plane, each recess being parallel with the XY plane;

two endcaps each being connected to a respective one of said two ends of the slide member, and two reinforcement plates each being connected to a respective one of the two endcaps so that each of the two endcaps is sandwiched between a respective one of the two reinforcement plates and the slide member, wherein each reinforcement plate includes a side plate and two bent extensions extending from the side plate; each side plate is parallel with the YZ plane and has two first fixing holes with a respective first fixing member penetrating each first fixing hole in the X-direction and each first fixing member being retained by a respective one of the first combining holes; each bent extension has a second fixing hole penetrated by a respective second fixing member in the Z-direction and each second fixing member retained by a respective one of the second combining holes; each bent extension has an engaging portion;

wherein each engaging portion is engaged with a respective one of the protrusions, thereby assisting in limiting the displacement of the reinforcement plates so as to increase connection between the endcaps and the slide member when the slide member slides on the rail;

the two protrusions on a respective one of the two legs are connected by a first line parallel to the X-direction;

the two second combining holes on the respective one of the two legs are connected by a second line parallel to the X-direction;

the first line being offset from the second line;

wherein the rail, the slide member, and the two endcaps form a circulation path, wherein the circulation path comprises a track located between the rail and the two legs of the slide member, two turning paths each located on a respective one of the endcaps and a returning path located on the slide member.

2. The movable member as claimed in claim 1, wherein each of the engaging portions is a hollow portion.

3. The movable member as claimed in claim 1, wherein each of the engaging portions is a cut at an edge.

4. The movable member as claimed in claim 1, a depth of each of the recesses and a height of each of the protrusions are equal to a thickness of the bent extensions.

5. The slide member as claimed in claim 1, wherein each of the protrusions and each of the engaging portions are polygonal in shape.

6. The slide member as claimed in claim 1, wherein each of the protrusions and each of the engaging portions are such that the engagement of the reinforcement plates and the slide member is in the form of recess and protrusion to bear large axial loads.

7. The slide member as claimed in claim 1, further comprising: respective rolling members are provided in each leg of the slide member, wherein the respective rolling members roll within each leg when the slide member slides on the rail.

* * * * *